US011977285B2

(12) United States Patent
Hai

(10) Patent No.: US 11,977,285 B2
(45) Date of Patent: May 7, 2024

(54) REFLECTION RATE DETECTION DEVICE AND REFLECTION RATE DETECTION METHOD FOR LIQUID CRYSTAL PANEL

(71) Applicant: Shenzhen China Star Optoelectronics Semiconductor Display Technology Co., Ltd., Guangdong (CN)

(72) Inventor: Bo Hai, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 829 days.

(21) Appl. No.: 17/047,725

(22) PCT Filed: Aug. 21, 2020

(86) PCT No.: PCT/CN2020/110392
§ 371 (c)(1),
(2) Date: Oct. 15, 2020

(87) PCT Pub. No.: WO2022/027735
PCT Pub. Date: Feb. 10, 2022

(65) Prior Publication Data
US 2023/0152612 A1 May 18, 2023

(30) Foreign Application Priority Data
Aug. 7, 2020 (CN) .......................... 202010787639.4

(51) Int. Cl.
*G02F 1/13* (2006.01)
*G01M 11/00* (2006.01)
*G02B 5/10* (2006.01)

(52) U.S. Cl.
CPC .......... *G02F 1/1309* (2013.01); *G01M 11/005* (2013.01); *G02B 5/10* (2013.01)

(58) Field of Classification Search
CPC ...... G02F 1/1309; G01M 11/005; G02B 5/10; G01N 2201/065; G01N 21/55
See application file for complete search history.

(56) References Cited

U.S. PATENT DOCUMENTS 4,093,991 A * 6/1978 Christie, Jr. ......... G01N 21/474
356/326
4,186,838 A * 2/1980 Levitt ................. G01N 21/4738
209/581
(Continued)

FOREIGN PATENT DOCUMENTS

CN 1920510 2/2007
CN 101221087 7/2008
(Continued)

OTHER PUBLICATIONS

Translation of Description of JP200793273 (Year: 2007).*

*Primary Examiner* — Roy M Punnoose

(57) ABSTRACT

A reflection rate detection device and reflection rate detection method for a liquid crystal panel are provided by embodiments of the present application. A sphere of the liquid crystal panel is a hollow sphere, and an inner wall of the sphere is uniformly sprayed with diffuse reflection materials. The sphere is provided with a window hole, and the window hole corresponds to the liquid crystal panel. The emitting light source is disposed on the sphere, the emitting light source is configured to emit light, and emitted light enters the liquid crystal panel. The receiver is configured to receive reflection energy of the liquid crystal panel. A reflection rate of a large-area liquid crystal panel can be detected by the present application.

18 Claims, 7 Drawing Sheets

(56) References Cited

U.S. PATENT DOCUMENTS

| | | | | |
|---|---|---|---|---|
| 5,369,481 A | * | 11/1994 | Berg | G01N 21/55 |
| | | | | 356/319 |
| 5,384,641 A | * | 1/1995 | Imura | G01N 21/474 |
| | | | | 250/228 |
| 5,956,133 A | * | 9/1999 | Imura | G01N 21/474 |
| | | | | 250/228 |
| 6,424,413 B1 | * | 7/2002 | Weber | G01J 3/0254 |
| | | | | 356/319 |
| 6,583,879 B1 | * | 6/2003 | Berg | G01J 3/04 |
| | | | | 356/402 |
| 2003/0011767 A1 | * | 1/2003 | Imura | G01J 3/28 |
| | | | | 356/326 |
| 2006/0132760 A1 | * | 6/2006 | Imura | G01J 3/28 |
| | | | | 356/243.8 |
| 2008/0165349 A1 | * | 7/2008 | Huang | G01J 1/02 |
| | | | | 356/124 |

FOREIGN PATENT DOCUMENTS

| | | | | |
|---|---|---|---|---|
| CN | 202177452 | | 3/2012 | |
| CN | 105509889 | | 4/2016 | |
| EP | 1329708 | | 7/2003 | |
| JP | 06050817 A | * | 2/1994 | |
| JP | 06207857 A | * | 7/1994 | G01J 3/51 |
| JP | H06207857 A | * | 7/1994 | G01J 3/51 |
| JP | H08313349 A | * | 11/1996 | G01J 3/4406 |
| JP | 09061243 A | * | 3/1997 | G01N 21/55 |
| JP | 11072388 A | * | 3/1999 | G01J 3/0254 |
| JP | H11118603 A | * | 4/1999 | G01N 21/6428 |
| JP | H11241949 A | * | 9/1999 | G01N 21/474 |
| JP | 2000205955 A | * | 7/2000 | G01J 3/28 |
| JP | 2000230861 A | * | 8/2000 | G01J 3/44 |
| JP | 2002243550 A | * | 8/2002 | G01J 3/50 |
| JP | 2002267600 A | * | 9/2002 | G01N 21/27 |
| JP | 3353560 | | 12/2002 | |
| JP | 2006292511 A | * | 10/2006 | G01J 3/443 |
| JP | 2007-093273 | | 4/2007 | |
| JP | 2007093273 A | * | 4/2007 | G01N 21/27 |
| JP | 5406402 | | 2/2014 | |
| JP | 2015-045618 | | 3/2015 | |
| WO | WO-2005062804 A2 | * | 7/2005 | G01J 3/0251 |

* cited by examiner

REFLECTION RATE DETECTION DEVICE AND REFLECTION RATE DETECTION METHOD FOR LIQUID CRYSTAL PANEL

RELATED APPLICATIONS

This application is a National Phase of PCT Patent Application No. PCT/CN2020/110392 having International filing date of Aug. 21, 2020, which claims the benefit of priority of Chinese Patent Application No. 202010787639.4 filed on Aug. 7, 2020. The contents of the above applications are all incorporated by reference as if fully set forth herein in their entirety.

FIELD AND BACKGROUND OF THE INVENTION

The present application relates to a field of display technology, and more particularly to a reflection rate detection device and reflection rate detection method for a liquid crystal panel.

For liquid crystal display televisions (LCD TVs), a reflection rate will affect a viewing effect in bright rooms. Reflection of the LCD TVs mainly occurs on an outermost polarizer, so it is very important to measure a reflection rate of an LCD panel and a polarizer. Commonly used measuring equipment can only measure very small samples, while current sizes of liquid crystal panel products have become increasingly larger, and cannot be measured.

Therefore, it is an urgent technical issue for those skilled in the art to provide a detection device capable of measuring a reflection rate of a large-area liquid crystal panel.

SUMMARY OF THE INVENTION

Embodiments of the present application provide a reflection rate detection device and reflection rate detection method for a liquid crystal panel to solve technical problems of measuring a reflection rate of a large-area liquid crystal panel.

An embodiment of the present application provides a reflection rate detection device for a liquid crystal panel, comprising:
  a sphere of a hollow sphere, wherein an inner wall of the sphere is uniformly sprayed with diffuse reflection materials, and the sphere is formed with a window hole corresponding to the liquid crystal panel;
  an emitting light source disposed on the sphere, wherein the emitting light source is configured to emit light and the emitted light enters the liquid crystal panel; and
  a receiver configured to receive a reflection energy of the liquid crystal panel.

In some embodiments, the emitting light source comprises a first light source, and the first light source scatters light to the liquid crystal panel and the inner wall of the sphere.

In some embodiments, the emitting light source comprises a second light source, the second light source is provided with a collimating device at a front end thereof, and the second light source is disposed on the sphere and located at an upper end of the sphere, an incident light of the second light source directly strikes toward the liquid crystal panel, and the liquid crystal panel reflects the light to the receiver.

In some embodiments, the emitting light source comprises a second light source, the second light source is provided with a collimating device at a front end thereof, the second light source is arranged outside the sphere and located at a lower end of the sphere, an incident light of the second light source strikes to the inside of the sphere, and a mirror reflection device is disposed on the inside of the sphere, and the mirror reflection device reflects the incident light to the liquid crystal panel, and the liquid crystal panel reflect the light to the receiver.

In some embodiments, an incident angle of the incident light of the second light source to the liquid crystal panel is 7 to 10 degrees.

In some embodiments, the emitting light source comprises a first light source and a second light source, the first light source scatters light to the liquid crystal panel and an inner wall of the sphere, the second light source is disposed on or outside of the sphere, incident light of the second light source directly strikes toward the liquid crystal panel, and the liquid crystal panel reflects the light to the receiver.

In some embodiments, a grating is disposed at the front end of the receiver.

In some embodiments, the first light source is a scattering light source, and the second light source is a direct light source.

In some embodiments, a total reflection energy of reflection energies of the liquid crystal panel to be tested and the calibration plate are respectively obtained by the receiver, and a total reflection rate of the liquid crystal panel to be tested is obtained by dividing the reflection energy of the liquid crystal panel to be tested by the total reflection energy of the calibration plate.

An embodiment of the present application further provides a reflection rate detection device for a liquid crystal panel is used for detection, the reflection rate detection device for a liquid crystal panel comprises a sphere, an emitting light source and a receiver, the sphere is a hollow sphere, an inner wall of the sphere is uniformly sprayed with diffuse reflection materials, the sphere is disposed with a window hole corresponding to the liquid crystal panel, the emitting light source is disposed on the sphere, and the emitting light source is configured to emit light, and the emitted light enters the liquid crystal panel, the receiver is configured to receive the reflection energy of the liquid crystal panel, and the detection method comprises following steps:
  obtaining a reflection energy of the calibration plate by using the reflection rate detection device for the liquid crystal panel;
  obtaining a reflection energy of the liquid crystal panel to be tested by using the reflection rate detection device for the liquid crystal panel; and
  obtaining a reflection rate of the liquid crystal panel according to a specular reflection energy of the calibration plate and a reflection energy of the liquid crystal panel to be tested, where the reflection rate comprises the total reflection rate and the specular reflection rate.

In some embodiments, obtaining the reflection energy of the calibration plate by using the reflection rate detection device for the liquid crystal panel comprises:
  turning on the first light source and turning off the second light source, and obtaining the total reflection energy of the specular reflection of the calibration plate by the receiver;
  and obtaining the reflection energy of the liquid crystal panel to be tested by using the reflection rate detection device for the liquid crystal panel comprises:
  turning on the first light source and turning off the second light source, and obtaining the total reflection energy of the liquid crystal panel to be tested by the receiver.

In some embodiments, obtaining the reflection energy of the calibration plate by using the reflection rate detection device for the liquid crystal panel comprises:
turning on the second light source and turning off the first light source, and obtaining the specular reflection energy of the calibration plate by the receiver;
and obtaining the reflection energy of the liquid crystal panel to be tested by using the reflection rate detection device for the liquid crystal panel comprises:
turning on the second light source and turning off the first light source, and obtaining the specular reflection energy of the liquid crystal panel to be tested by the receiver.

In some embodiments, obtaining a reflection rate of the liquid crystal panel according to a specular reflection energy of the calibration plate and a reflection energy of the liquid crystal panel to be tested, where the reflection rate comprises the total reflection rate and the specular reflection rate comprises:
dividing the specular reflection energy of the liquid crystal panel to be tested by the specular reflection energy of the calibration plate, and obtaining the specular reflection rate of the liquid crystal panel to be tested.

In some embodiments, the emitting light source comprises a first light source, and the first light source scatters light to the liquid crystal panel and the inner wall of the sphere.

In some embodiments, the emitting light source comprises a second light source, a collimating device is disposed at the front end of the second light source, and the second light source is arranged on the sphere and disposed at the upper end of the sphere, the incident light of the second light source directly strikes toward the liquid crystal panel, and the liquid crystal panel reflects the light to the receiver.

In some embodiments, the emitting light source comprises a second light source, a front end of the second light source is provided with a collimating device, and the second light source is disposed outside the sphere and located at a lower end of the sphere, the incident light of the second light source strikes inside of the sphere, and a mirror reflection device is disposed on the inside of the sphere, the mirror reflection device reflects the incident light to the liquid crystal panel, and the liquid crystal panel reflects the light to the receiver.

In some embodiments, an incident angle of the incident light of the second light source into the liquid crystal panel is 7 to 10 degrees.

In some embodiments, the emitting light source comprises a first light source and a second light source, and the first light source scatters light to the liquid crystal panel and the inner wall of the sphere, the second light source is disposed on or outside of the sphere, the incident light of the second light source directly strikes toward the liquid crystal panel, and the liquid crystal panel reflects the light to the receiver.

In some embodiments, a grating is disposed at the front end of the receiver.

In some embodiments, the first light source is a scattered light source, and the second light source is a direct light source.

A reflection rate detection device and reflection rate detection method for a liquid crystal panel are provided by embodiments of the present application. The detection device for the liquid crystal panel comprises a sphere, an emitting light source, and a receiver. The sphere is a hollow sphere, and an inner wall of the sphere is uniformly sprayed with diffuse reflection materials. The sphere is provided with a window hole, and the window hole corresponds to the liquid crystal panel. The emitting light source is disposed on the sphere, the emitting light source is configured to emit light, and the emitted light enters the liquid crystal panel. The receiver is configured to receive the reflection energy of the liquid crystal panel. Due to the structure of the application, the reflection energy of the liquid crystal panel to be tested and the energy of the calibration plate can be individually detected, and then the ratio of the reflection energy of the liquid crystal panel to be tested to the energy of the calibration plate is calculated to obtain the reflection rate of the liquid crystal panel to be tested.

BRIEF DESCRIPTION OF THE SEVERAL VIEWS OF THE DRAWINGS

To detailly explain the technical schemes of the embodiments or existing techniques, drawings that are used to illustrate the embodiments or existing techniques are provided. Apparently, the illustrated embodiments are just a part of those of the present disclosure. It is easy for any person having ordinary skill in the art to obtain other drawings without labor for inventiveness.

DESCRIPTION OF SPECIFIC EMBODIMENTS OF THE INVENTION

The technical solutions in the embodiments of the present application will be described clearly and completely with reference to the drawings in the embodiments of the present application. Obviously, the described embodiments are only a part of the embodiments of the present application, but not all the embodiments. Based on the embodiments in the present application, all other embodiments obtained by those skilled in the art without making creative work fall within the protection scope of the present application.

Embodiments of the present application provide a reflection rate detection device and reflection rate detection method for a liquid crystal panel. The reflection rate detection device for a liquid crystal panel will be described in detail in the following.

Figure 1:
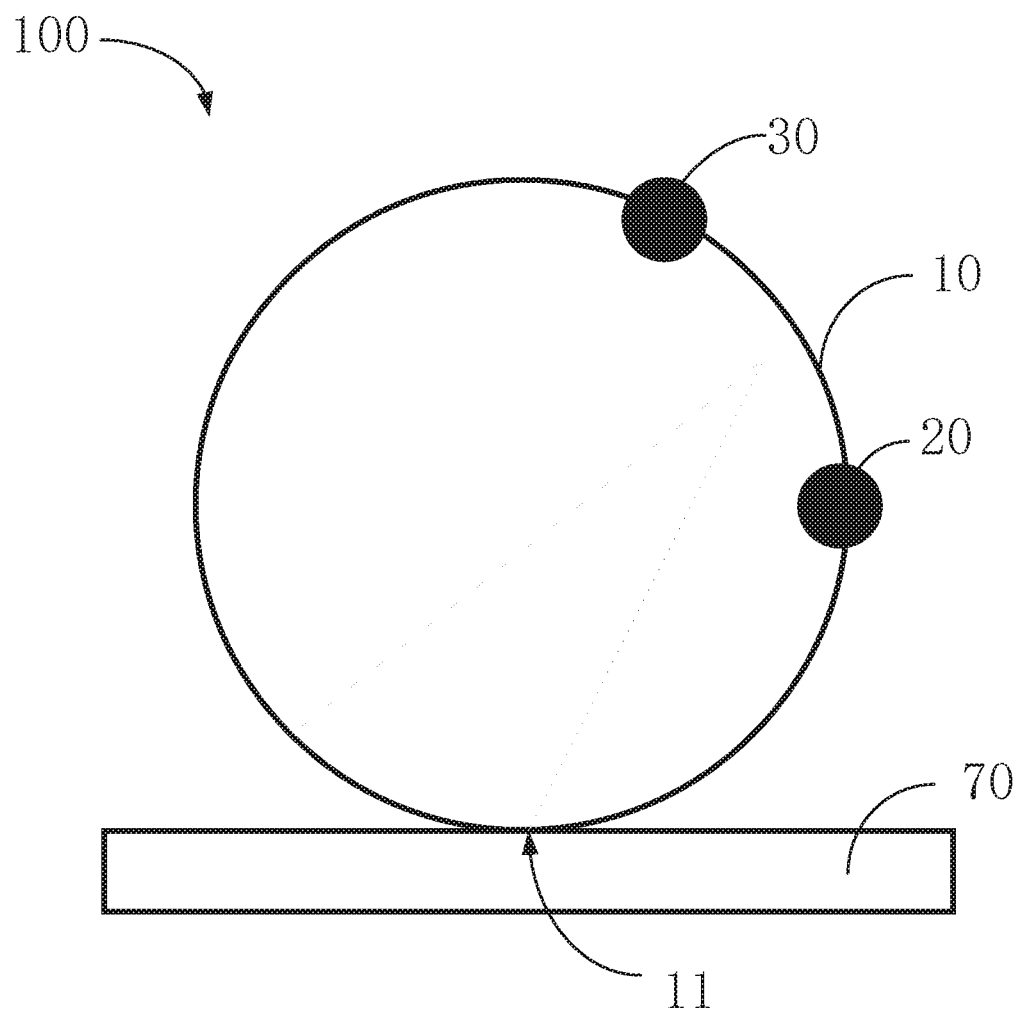
FIG. 1 is a schematic structural diagram of a reflection rate detection device for a liquid crystal panel provided by an embodiment of the application.

Please refer to FIG. 1, FIG. 1 is a schematic structural diagram of a reflection rate detection device for a liquid crystal panel provided by an embodiment of the present application. Herein, the reflection rate detection device for the liquid crystal panel 100 comprises a sphere 10, an emitting light source 20, and a receiver 30. The sphere 10 is a hollow sphere 10, and an inner wall of the sphere 10 is uniformly sprayed with diffuse reflection materials. The sphere 10 is formed with a window hole 11, and the window hole 11 corresponds to the liquid crystal panel 70. The emitting light source 20 is disposed on the sphere 10, and the emitting light source 20 is configured to emit light. The emitted light enters a liquid crystal panel 70, and the receiver 30 is configured to receive a reflection energy of the liquid crystal panel 70.

Herein, the diffuse reflection materials may be magnesium oxide, barium sulfate, or the like. In the embodiments of the present application, the diffuse reflection materials are not described in detail. In addition, a plurality of window holes 11 may be formed on the sphere 10, and the window holes 11 correspond to other parts. For example, the emitting light source 20 can be disposed on outside of the sphere 10, and the sphere 10 is formed with a window hole 11 corresponding to the emitting light source 20, and the light emitted from the emitting light source 20 can enter an inner wall of the sphere 10 through the window hole 11.

Herein, there are one or more the emitting light source 20, and the emitting light source 20 may be a scattering light source, and of course can also be a direct light source.

Herein, the receiver 30 may be installed inside the sphere 10, and the receiver 30 is configured to receive the reflection energy of the liquid crystal panel 70 or the reflection energy of the liquid crystal panel 70 and the inner wall of the sphere 10.

Figure 2:
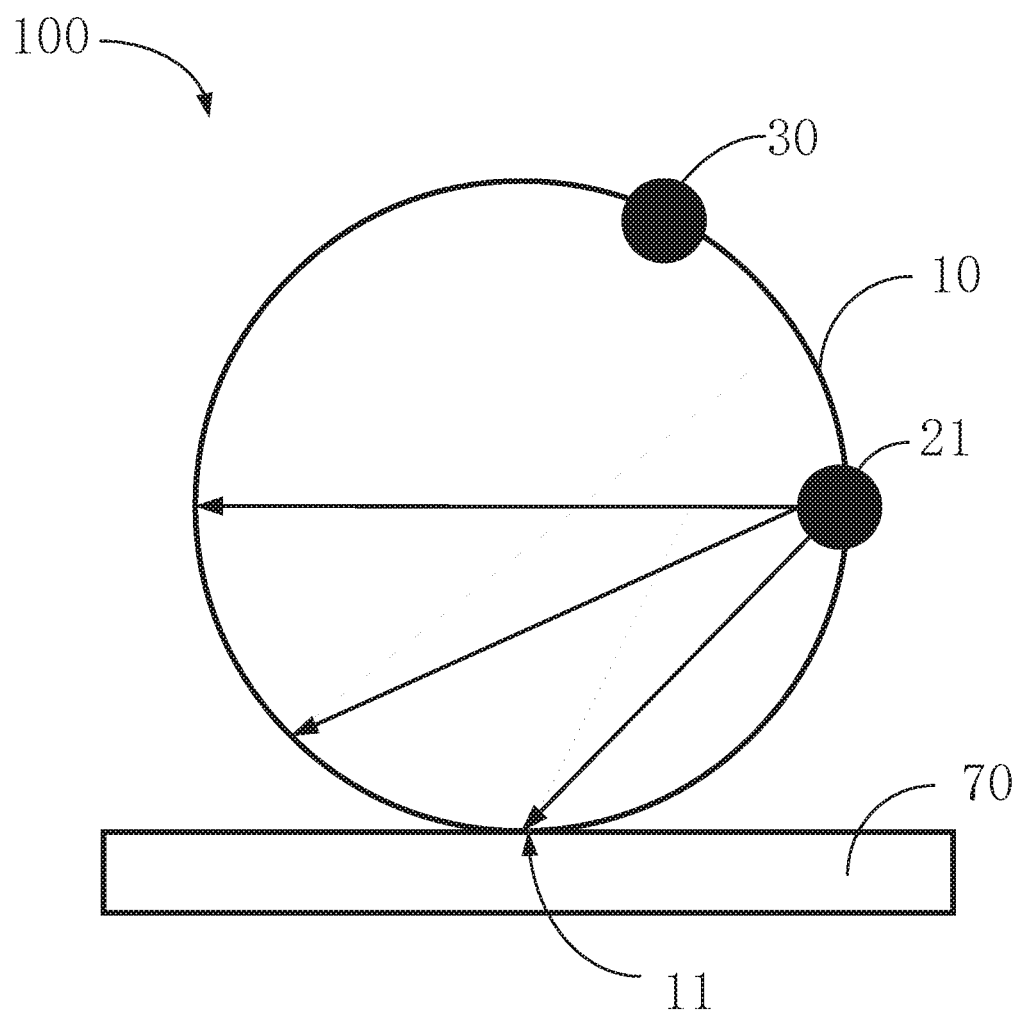
FIG. 2 is a schematic diagram of another structure of the reflection rate detection device for the liquid crystal panel by an embodiment of the application.

Please refer to FIG. 2, FIG. 2 is a schematic diagram of another structure of the reflection rate detection device for the liquid crystal panel provided by an embodiment of the present application. Herein, the emitting light source 20 comprises a first light source 21, and the first light source 21 scatters light to the liquid crystal panel and the inner wall of the sphere 10.

It should be noted that the first light source 21 is a scattering light source. That is, the light emitted by the first light source 21 can be scattered to various directions inside the sphere 10, while a part of the light hits the liquid crystal panel 70. At this time, the receiver 30 can receive the reflection energy of the liquid crystal panel 70 and the inner wall of the sphere 10. A calibration plate and the liquid crystal panel 70 to be tested are individually measured, and the calibration plate uses a white board made of magnesium oxide or barium sulfate, Then, a total reflection rate is obtained and equals to dividing the total reflection energy of the liquid crystal panel 70 to be tested by the reflection energy of the calibration plate.

Figure 3:
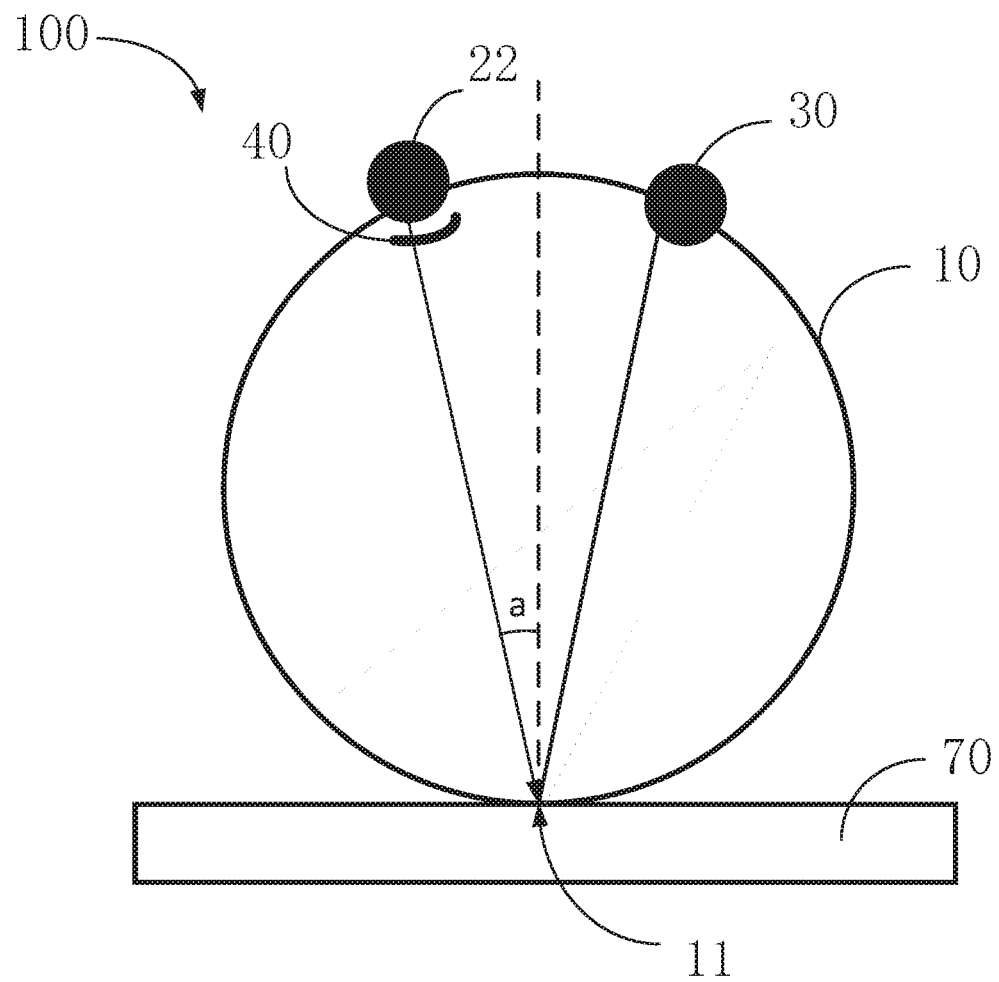
FIG. 3 is a schematic diagram of yet another structure of the reflection rate detection device for the liquid crystal panel provided by an embodiment of the application.

Please refer to FIG. 3, FIG. 3 is a schematic diagram of yet another structure of the reflection rate detection device for the liquid crystal panel provided by an embodiment of the present application. Herein, the emitting light source 20 comprises a second light source 22, and a collimating device 40 is disposed on a front end of the second light source 22. The second light source 22 is disposed on the sphere 10 and located at an upper end of the sphere 10. Incident light of the second light source 22 directly strikes the liquid crystal panel 70, and the liquid crystal panel 70 reflects the light to the receiver 30.

It should be noted that the collimating device can change the light from the second light source 22 into a collimated light. For example, the collimating device is an aspheric lens. Of course, the collimating device can also adopt other types of collimating devices. By individually measuring the calibration plate and the liquid crystal panel 70 to be tested, and the calibration plate using a white board made of magnesium oxide or barium sulfate, a specular reflection rate is then obtained and equals to dividing a specular reflection energy of the liquid crystal panel 70 to be tested by a specular reflection energy of the calibration plate.

Figure 4:
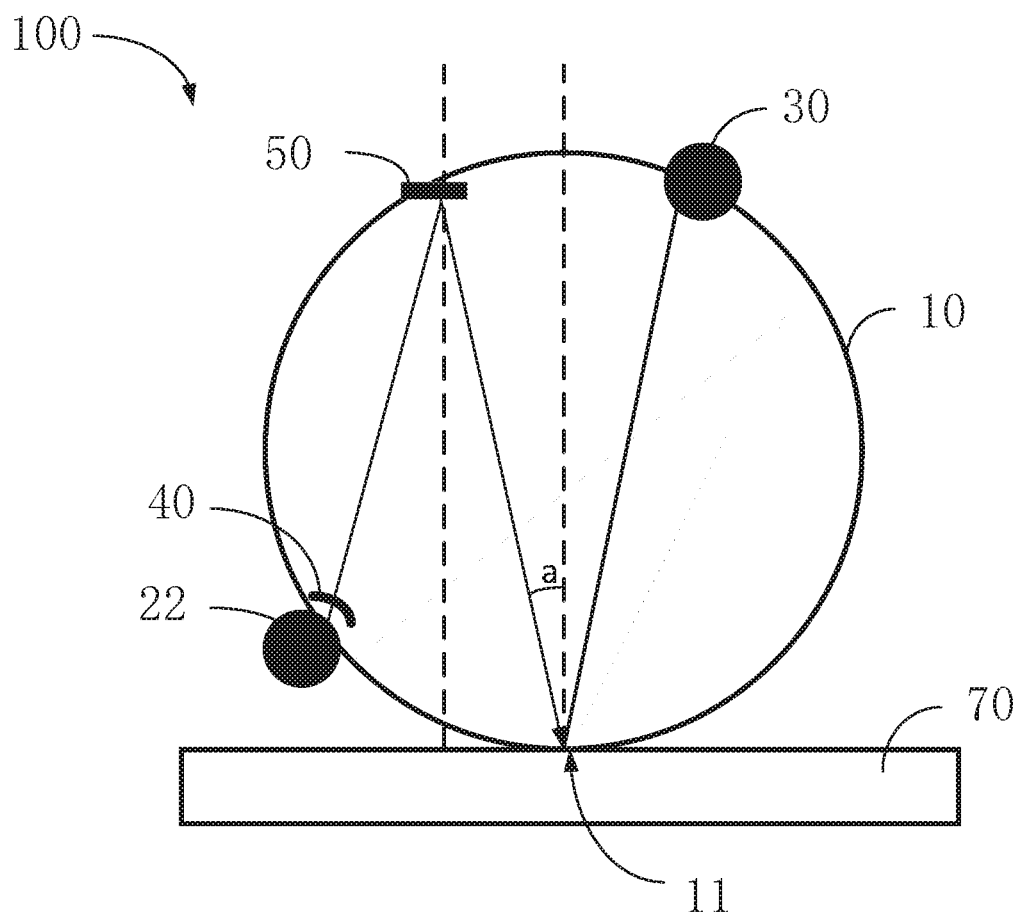
FIG. 4 is a schematic diagram of still another structure of the reflection rate detection device for the liquid crystal panel provided by an embodiment of the application.

Please refer to FIG. 4, FIG. 4 is a schematic diagram of still another structure of the reflection rate detection device for the liquid crystal panel provided by an embodiment of the present application. Herein, the emitting light source 20 comprises the second light source 22, and a collimating device 40 is arranged at the front end of the second light source 22. The second light source 22 is arranged outside the sphere 10 and located at the lower end of the sphere 10. The incident light of the second light source 22 directly strikes the inside of the sphere 10, and a mirror reflection device 50 that reflects the incident light to the liquid crystal panel 70 is disposed in the inside of the sphere 10 so that the liquid crystal panel 70 reflects the light to the receiver 30.

It should be noted that the second light source 22 is disposed outside the sphere 10, which can save a process of installing the second light source 22 on the sphere 10, and can also save the space in the sphere 10 at the same time. In this embodiment of the present application, the calibration plate and the liquid crystal panel 70 to be tested are individually measured, and the calibration plate is a white board made of magnesium oxide or barium sulfate, and a specular reflection rate is then obtained and equals dividing the specular reflection energy of the liquid crystal panel 70 to be tested by the specular reflection energy of the calibration plate.

Herein, an incident angle a of the incident light of the second light source 22 into the liquid crystal panel 70 is 7 to 10 degrees.

It should be noted that the incident angle a can be 7 degrees, 8 degrees, and 10 degrees. In some embodiments, the incident angle of 8 degrees enables the receiver 30 to better receive the reflection light of the liquid crystal panel 70.

Figure 5:
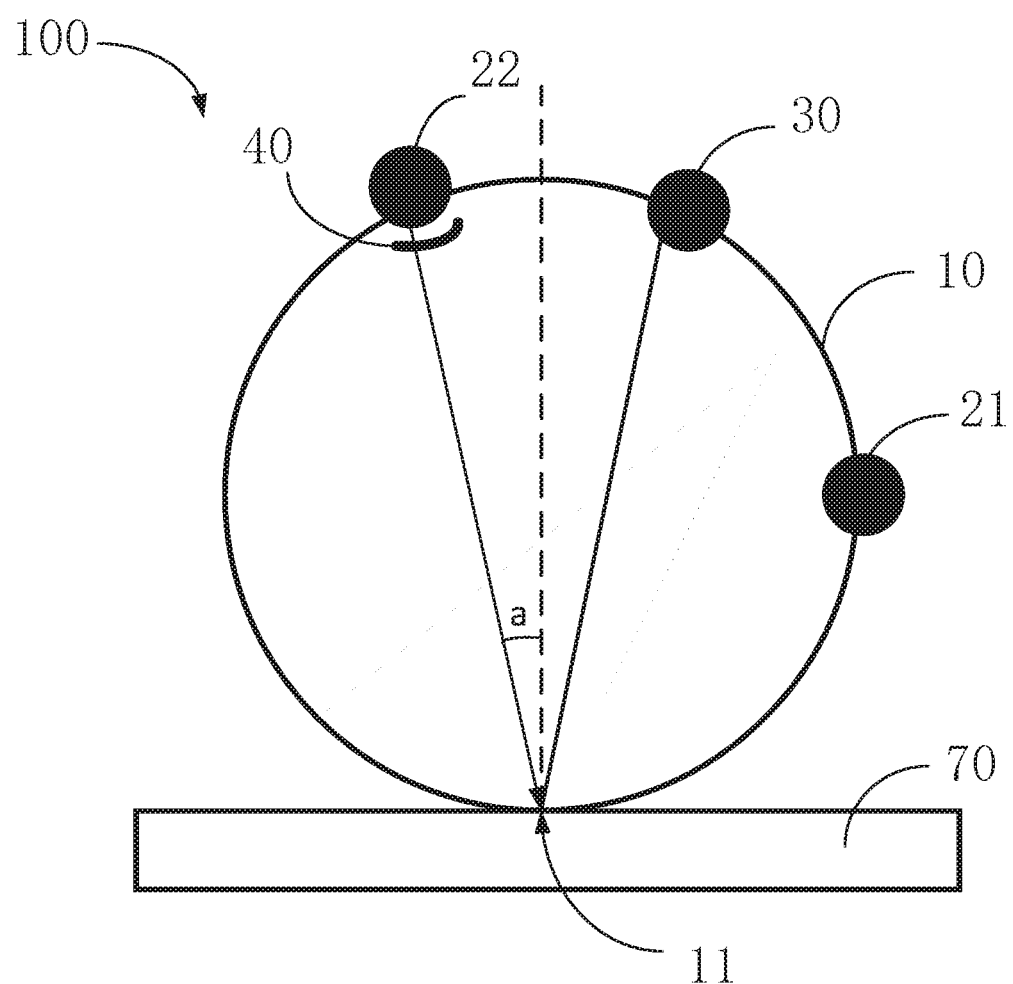
FIG. 5 is a schematic diagram of still another structure of the reflection rate detection device for the liquid crystal panel provided by an embodiment of the application.
Figure 6:
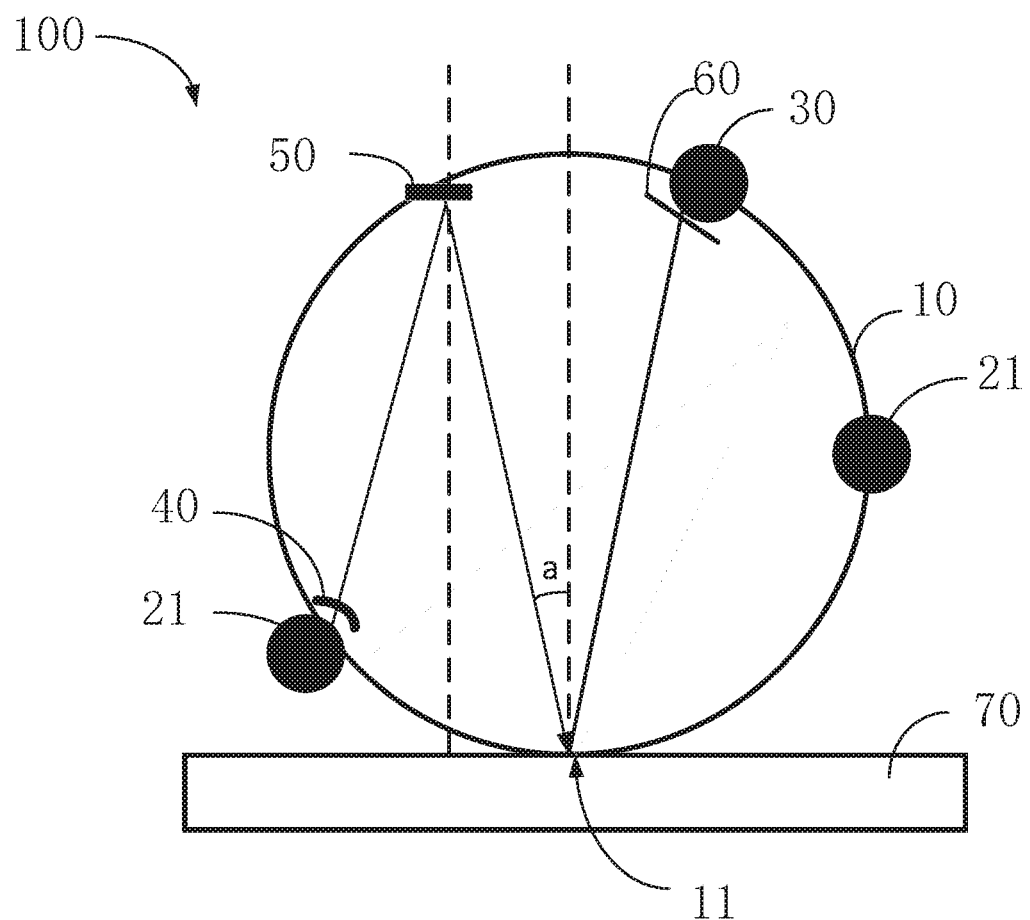
FIG. 6 is a schematic diagram of still another structure of the reflection rate detection device for the liquid crystal panel provided by an embodiment of the application.

Please refer to FIG. 5 and FIG. 6. FIG. 5 is a schematic diagram of another structure of the reflection rate detection device for the liquid crystal panel provided by an embodiment of the present application. FIG. 6 is a schematic diagram of another structure of the reflection rate detection device for the liquid crystal panel provided by an embodiment of the present application where the emitting light source 20 comprise the first light source 21 and the second light source 22. The first light source 21 scatters light to the liquid crystal panel and the inner wall of the sphere 10, and the second light source 22 is disposed on the sphere 10 or the outside of the sphere 10. The incident light of the second light source 22 directly strikes toward the liquid crystal panel 70, and the liquid crystal panel 70 reflects the light into the receiver 30.

It should be noted that the first light source 21 is a scattering light source, and the second light source 22 is a direct light source. The first light source 21 is turned on and the second light source 22 is turned off so that a total reflection energy of the reflection energy of the liquid crystal panel 70 to be tested and the calibration plate are individually obtained by the receiver 30. The total reflection energy of the liquid crystal panel 70 to be tested is divided by the total reflection energy of the calibration plate to obtain the total reflection rate of the liquid crystal panel 70 to be tested. The second light source 22 is turned on and the first light source 21 is turned off, and the specular reflection energy of the liquid crystal panel 70 to be tested and the calibration plate are individually obtained by the receiver 30. The specular reflection energy of the liquid crystal panel 70 to be tested is divided by the specular reflection energy of the calibration plate to obtain the specular reflection rate of the liquid crystal panel 70 to be tested. The total reflection rate of the liquid crystal panel 70 to be tested is subtracted from the specular reflection rate of the liquid crystal panel 70 to be tested to obtain the diffuse reflection rate of the liquid crystal panel 70 to be tested.

Herein, a grating 60 is disposed at the front end of the receiver 30.

It should be noted that by disposing the grating 60 at the front end of the receiver 30, an emission spectrum can be measured.

In the embodiment of the present application, a reflection rate detection device 100 for a liquid crystal panel comprises a sphere 10, an emitting light source 20, and a receiver 30. The sphere 10 is a hollow sphere 10, and an inner wall of the sphere 10 is uniformly sprayed with diffuse reflection materials. A window hole 11 is disposed on the sphere 10, and the window hole 11 corresponds to the liquid crystal panel 70. The emitting light source 20 is disposed on the sphere 10, the emitting light source 20 is configured to emit light, and the emitted light enters the liquid crystal panel 70. The receiver 30 is configured to receive the reflection energy of the liquid crystal panel 70. Due to the structures of the present application, the reflection energy of the liquid crystal panel 70 to be tested and the energy of the calibration plate can be detected individually, and a reflection rate of the liquid crystal panel 70 to be tested is then obtained by calculating a ratio of the reflection energy of the liquid crystal panel 70 to be tested to the energy of the calibration plate.

Figure 7:
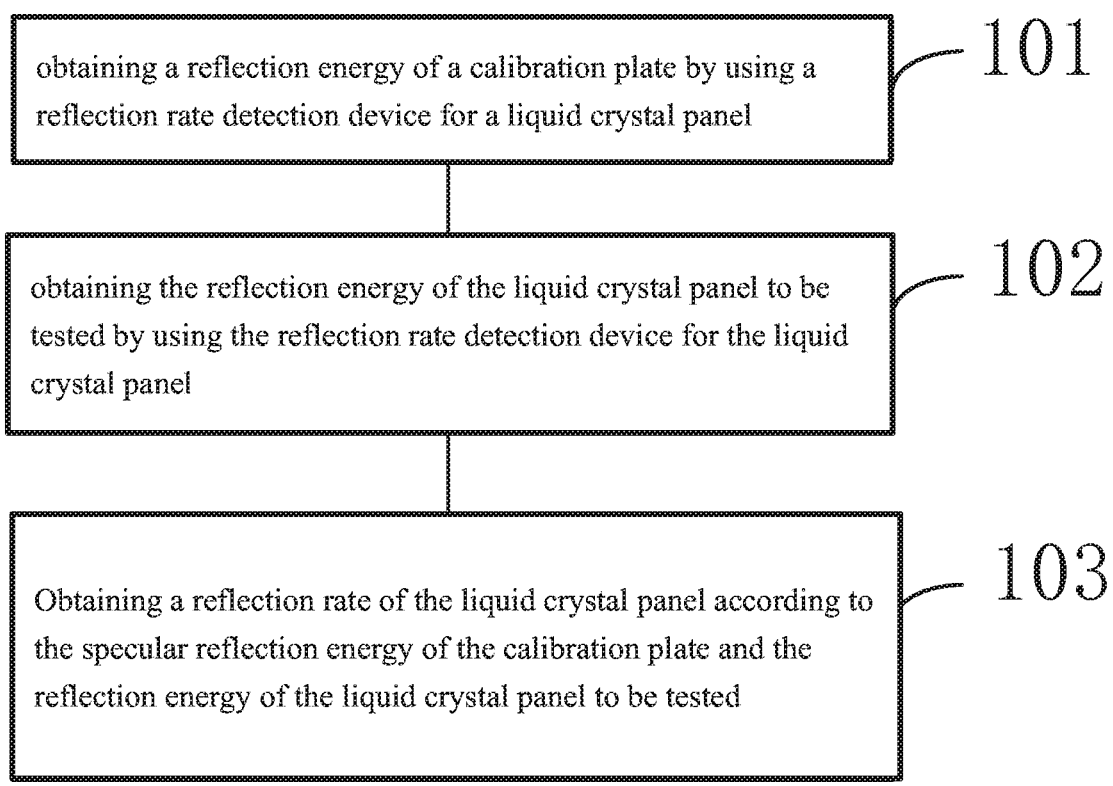
FIG. 7 is a schematic flowchart of a reflection rate detection method for a liquid crystal panel provided by an embodiment of the application.

Please refer to FIG. 7, which is a schematic flowchart of a detection method of a reflection rate of a liquid crystal panel according to an embodiment of the application. Herein, the detection method of the reflection rate of the liquid crystal panel uses the reflection rate detection devices for the liquid crystal panel liquid crystal panel described in the above-mentioned embodiments, comprising following steps:

Step 101: obtaining a reflection energy of a calibration plate by using a reflection rate detection device for a liquid crystal panel It should be noted that a calibration plate is a white board made of magnesium oxide or barium sulfate. The calibration plate is disposed on the reflection rate detection device for the liquid crystal panel, and a total reflection energy and a specular reflection energy of the calibration plate is obtained by respectively on a first light source or a second light source of the reflection rate detection device for the liquid crystal panel. Herein, the reflection rate detection device for the liquid crystal panel can be a reflection rate detection device for a liquid crystal panel in the above-mentioned embodiments, and the reflection rate detection device for the liquid crystal panel of the present embodiment of the present application will not be described in detail.

Specifically, the first light source is turned on and the second light source is turned off, the total reflection energy of the liquid crystal panel to be tested is obtained by the receiver. The second light source is turned on and the first light source is turned off, and the specular reflection energy of the calibration plate is obtained by the receiver.

Step 102: obtaining the reflection energy of the liquid crystal panel to be tested by using the reflection rate detection device for the liquid crystal panel It should be noted that the liquid crystal panel to be tested is disposed on the reflection rate detection device for the liquid crystal panel, and the total reflection energy and specular reflection energy of the calibration plate are obtained by respectively turning on the first light source or the second source of the reflection rate detection device for the liquid crystal panel. Herein, the reflection rate detection device for the liquid crystal panel is the reflection rate detection device for the liquid crystal panel in the above-mentioned embodiments, and the reflection rate detection device for the liquid crystal panel in the present embodiment of the present application will not be described in detail.

Specifically, the first light source is turned on and the second light source is turned off, and the total reflection energy of the liquid crystal panel to be tested is obtained by the receiver. The second light source is turned on and the first light source is turned off, and the specular reflection energy of the panel to be tested is obtained by the receiver.

Step 103: Obtaining a reflection rate of the liquid crystal panel according to the specular reflection energy of the calibration plate and the reflection energy of the liquid crystal panel to be tested. Herein, the reflection rate comprises the total reflection rate and the specular reflection rate.

It should be noted that the specular reflection energy of the liquid crystal panel to be tested is obtained by dividing the specular reflection energy of the calibration plate by the specular reflection energy of the liquid crystal panel to be tested. The total reflection energy of the liquid crystal panel to be tested is obtained by dividing the total reflection energy of the calibration plate by the total reflection rate of the liquid crystal panel to be tested. The total reflection rate of the liquid crystal panel to be tested is subtracted from the specular reflection rate of the liquid crystal panel to be tested to obtain a reflection rate of the diffuse reflectance of the liquid crystal panel to be tested.

Due to the method of the embodiment of the present application, the reflection energy of the liquid crystal panel to be tested and the reflection energy of the calibration plate can be individually detected, and then a ratio of the reflection energy of the liquid crystal panel to be tested to the reflection energy of the calibration plate is calculated to obtain the reflection rate of the liquid crystal panel.

The reflection rate detection device and reflection rate detection method for the liquid crystal panel by the embodiments of the present application are introduced in detail. The descriptions of the above embodiments are only used to help understand the technology of the present application, solutions and their core ideas; those of ordinary skill in the art should understand that they can still modify the technical solutions described in the foregoing embodiments or equivalently replace some of the technical features, and these modifications or replacements do not make the essence of the corresponding technical solutions deviate from the scope of the technical solutions of the embodiments of the present application.

What is claimed is:

1. A reflection rate detection device for a liquid crystal panel, comprising:
   a sphere, wherein the sphere is a hollow sphere, an inner wall of the sphere is uniformly sprayed with diffuse reflection materials, and the sphere is formed with a window hole corresponding to the liquid crystal panel;
   an emitting light source disposed on the sphere, wherein the emitting light source is configured to emit light and emitted light enters the liquid crystal panel; and
   a receiver configured to receive a reflection energy of the liquid crystal panel,
   wherein the emitting light source comprises a second light source, the second light source is provided with a collimating device at a front end thereof, the second light source is arranged outside the sphere and located at a lower end of the sphere, an incident light of the second light source strikes to an inside of the sphere, a mirror reflection device is disposed on the inside of the sphere, the minor reflection device reflects the incident light to the liquid crystal panel, and the liquid crystal panel reflects the light to the receiver.

2. The reflection rate detection device for the liquid crystal panel according to claim 1, wherein the emitting light source comprises a first light source, and the first light source scatters light to the liquid crystal panel and the inner wall of the sphere.

3. The reflection rate detection device for the liquid crystal panel according to claim 1, wherein the emitting light source comprises a second light source, the second light source is provided with a collimating device at a front end thereof, the second light source is disposed on the sphere and located at an upper end of the sphere, an incident light of the second light source directly strikes toward the liquid crystal panel, and the liquid crystal panel reflects the light to the receiver.

4. The reflection rate detection device for the liquid crystal panel according to claim 1, wherein an incident angle of the incident light of the second light source to the liquid crystal panel is 7 to 10 degrees.

5. The reflection rate detection device for the liquid crystal panel according to claim 1, wherein the emitting light source comprises a first light source and a second light source, the first light source scatters light to the liquid crystal panel and the inner wall of the sphere, the second light source is disposed on or outside of the sphere, an incident light of the second light source directly strikes toward the liquid crystal panel, and the liquid crystal panel reflects the light to the receiver.

6. The reflection rate detection device for the liquid crystal panel according to claim 1, wherein a grating is disposed at a front end of the receiver.

7. The reflection rate detection device for the liquid crystal panel according to claim 5, wherein the first light source is a scattering light source, and the second light source is a direct light source.

8. The reflection rate detection device for the liquid crystal panel according to claim 1, wherein a total reflection energy of reflection energies of a liquid crystal panel to be tested and a calibration plate are respectively obtained by the receiver, and a total reflection rate of the liquid crystal panel to be tested is obtained by dividing the reflection energy of the liquid crystal panel to be tested by the total reflection energy of the calibration plate.

9. A reflection rate detection method for a liquid crystal panel, wherein a reflection rate detection device for the liquid crystal panel is configured to detect, the reflection rate detection device for the liquid crystal panel comprises a sphere, an emitting light source, and a receiver, the sphere is a hollow sphere, an inner wall of the sphere is uniformly sprayed with diffuse reflection materials, the sphere is disposed with a window hole corresponding to the liquid crystal panel, the emitting light source is disposed on the sphere, the emitting light source is configured to emit light, the emitted light enters the liquid crystal panel, the receiver is configured to receive a reflection energy of the liquid crystal panel, and the detection method comprises following steps:

obtaining a reflection energy of a calibration plate by using the reflection rate detection device for the liquid crystal panel;

obtaining a reflection energy of a liquid crystal panel to be tested by using the reflection rate detection device for the liquid crystal panel; and obtaining a reflection rate of the liquid crystal panel according to a specular reflection energy of the calibration plate and the reflection energy of the liquid crystal panel to be tested, wherein the reflection rate comprises a total reflection rate and a specular reflection rate, wherein the emitting light source comprises a second light source, a front end of the second light source is provided with a collimating device, the second light source is disposed outside the sphere and located at a lower end of the sphere, an incident light of the second light source strikes an inside of the sphere, a mirror reflection device is disposed on the inside of the sphere, the minor reflection device reflects the incident light to the liquid crystal panel, and the liquid crystal panel reflects the light to the receiver.

10. The reflection rate detection method for the liquid crystal panel according to claim 9, wherein obtaining the reflection energy of the calibration plate by using the reflection rate detection device for the liquid crystal panel comprises:

turning on a first light source and turning off a second light source, and obtaining a total reflection energy of specular reflection of the calibration plate by the receiver; and obtaining the reflection energy of the liquid crystal panel to be tested by using the reflection rate detection device for the liquid crystal panel comprises:

turning on the first light source and turning off the second light source, and obtaining a total reflection energy of the liquid crystal panel to be tested by the receiver.

11. The reflection rate detection method for the liquid crystal panel according to claim 9, wherein obtaining the reflection energy of the calibration plate by using the reflection rate detection device for the liquid crystal panel comprises:

turning on a second light source and turning off a first light source, and obtaining the specular reflection energy of the calibration plate by the receiver; and obtaining the reflection energy of the liquid crystal panel to be tested by using the reflection rate detection device for the liquid crystal panel comprises:

turning on the second light source and turning off the first light source, and obtaining a specular reflection energy of the liquid crystal panel to be tested by the receiver.

12. The reflection rate detection method for the liquid crystal panel according to claim 9, wherein obtaining the reflection rate of the liquid crystal panel according to the specular reflection energy of the calibration plate and the reflection energy of the liquid crystal panel to be tested, wherein the reflection rate comprises the total reflection rate and the specular reflection rate comprises:

dividing a specular reflection energy of the liquid crystal panel to be tested by the specular reflection energy of the calibration plate, and obtaining a specular reflection rate of the liquid crystal panel to be tested.

13. The reflection rate detection method for the liquid crystal panel according to claim 9, wherein the emitting light source comprises a first light source, and the first light source scatters light to the liquid crystal panel and the inner wall of the sphere.

14. The reflection rate detection method for the liquid crystal panel according to claim 13, wherein the emitting light source comprises a second light source, a collimating device is disposed at a front end of the second light source, the second light source is arranged on the sphere and disposed at an upper end of the sphere, an incident light of the second light source directly strikes toward the liquid crystal panel, and the liquid crystal panel reflects the light to the receiver.

15. The reflection rate detection method for the liquid crystal panel according to claim 5, wherein an incident angle of the incident light of the second light source into the liquid crystal panel is 7 to 10 degrees.

16. The reflection rate detection method for the liquid crystal panel according to claim 10, wherein the emitting light source comprises a first light source and a second light source, the first light source scatters light to the liquid crystal panel and the inner wall of the sphere, the second light source is disposed on or outside of the sphere, an incident light of the second light source directly strikes toward the liquid crystal panel, and the liquid crystal panel reflects the light to the receiver.

17. The reflection rate detection method for the liquid crystal panel according to claim 9, wherein a grating is disposed at a front end of the receiver.

18. The reflection rate detection method for the liquid crystal panel according to claim 16, wherein the first light source is a scattered light source, and the second light source is a direct light source.

\* \* \* \* \*